United States Patent Office 3,707,433
Patented Dec. 26, 1972

3,707,433
INSULATING MATERIAL
Philip J. Clough, Cape Elizabeth, Maine, and Robert W. Steeves, Nahant, Mass., assignors to King-Seeley Thermos Co., Ann Arbor, Mich.
Continuation-in-part of abandoned application Ser. No. 722,226, Apr. 18, 1968, which is a continuation-in-part of abandoned application Ser. No. 482,473, Aug. 25, 1965. This application May 18, 1970, Ser. No. 38,211
Int. Cl. B32b 3/12, 15/08
U.S. Cl. 161—143                                26 Claims

ABSTRACT OF THE DISCLOSURE

Insulating material of two layers of plastic film sandwiched around a reinforcement of fibers and containing vacuum deposited metal within the sandwich. The film is selected to provide a transmission in excess of 80% for infra-red radiation in the range of 80,000–90,000 angstroms. The laminate as a whole has a very low apparent K conductivity factor.

Figure 1:
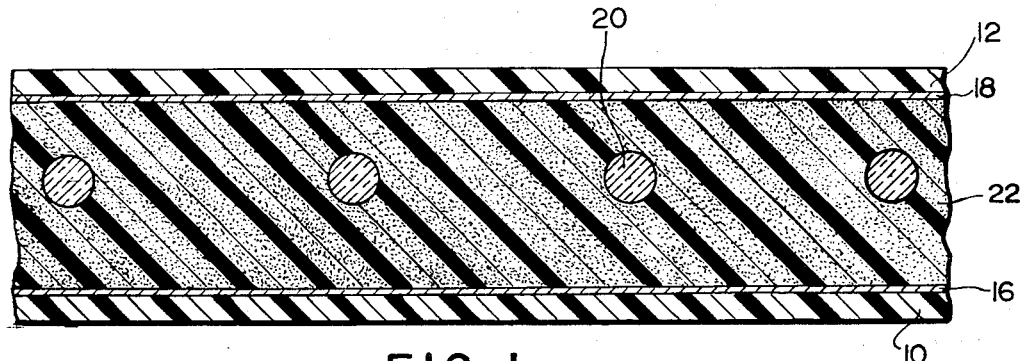

This application is a continuation-in-part of our copending application Ser. No. 722,226 filed Apr. 18, 1968, now abandoned which in turn is a continuation-in-part of Ser. No. 482,473 filed Aug. 25, 1965, now abandoned.

The invention relates to a new insulating material having broad application where transfer of heat is to be limited.

BACKGROUND

The utiilty of vacuum deposited films of metal for reflecting radiant heat is well known in the prior art and it has been widely used for this purpose in superinsulation systems which protect cryogenic fluids in space vehicles, aircraft, etc. However, there has been no substantial use of vacuum metallized films in down-to-earth insulating applications such as retaining body heat, maintaining temperature of camper of picnic supplies, limiting stored food spoilage or preventing frost damage to crops.

OBJECTS OF THE INVENTION

The principal object of the invention is to provide a novel insulating material at low cost and high strength having utility in thermal insulation tasks generally and offering distinctly advantageous benefits in connection with thermal insulation of human body heat.

Another object of the invention is to provide such insulating material having high tear resistance, good stitchability and a "hand" equivalent to cloth.

Another object of the invention is to provide insulating material having extremely high insulating value with light weight and minimum thickness.

Still another object of the invention is to provide insulating material which can be embodied in apparel, blankets and the like.

Another object of the invention is to provide a novel insulating material which has wide applicability to structural elements, agricultural insulation and the like.

GENERAL DESCRIPTION

The invention achieves this object through the provision of an insulating material of two layers of plastic film sandwiched around a reinforcement of fibers and containing vacuum deposited metal within the sandwich. The film is selected to provide a transmission in excess of 80% for infra-red radiation in the range of 80,000–90,000 angstroms. The laminate as a whole has a very low apparent K conductivity factor.

Most species of the invention are wholly opaque to moisture vapor penetration since they comprise unbroken plastic films. In some species, a limited amount of moisture vapor transmission, consistent with other features of the invention described herein, is permitted through the provision of punched through holes reinforced by fibrous bundles; in each such species a fibrous layer is provided along one or both sides of the plastic laminate to give it a soft surface and good hand and to improve its comfortable use in human body insulating applications.

Other objects, features and advantages of the invention will in part be obvious and will in part appear hereinafter.

The present invention accordingly comprises the product possessing the features, properties, and the relation of components which are exemplified in the following detailed disclosure, and the scope of the application which will be directed in the claims.

SPECIFIC DESCRIPTION AND DRAWINGS

For a fuller understanding of the nature and objects of the invention, reference should be had to the following detailed description taken in connection with the accompanying drawings wherein:

FIG. 1 is a schematic, diagrammatic, exaggerated, sectional view of one embodiment of the invention; and FIGS. 2–6 are similar views of the invention in more additional embodiments thereof.

In the present invention, the insulating properties of a metallized plastic (e.g. vacuum-aluminized polyethylene) is employed to provide the basic insulation qualities of the product. The aluminized plastic preferably has an emissivity of less than .2 at a measured temperature of 100° F. (corresponding to the peak wavelength of 8 to 9 microns). The reflectance of such a metallized plastic is extremely high in the infra-red. The plastic film preferably has low absorption for infra-red so that the reflectance to infra-red impinging on the plastic surface is at least 80% and the emissivity from that surface is less than .2 at a wavelength of 8 to 9 microns.

In a preferred embodiment of the invention, there are two metallized layers of plastic employed in the product, the product being formed as a sandwich so arranged that metallized surfaces face each other in the interior of the sandwich, the plastic layers forming the outer surface. A layer of reinforcing fibers is preferably provided between the two facing metallized layers, these fibers being adhesively united to the two metal layers to form a unitary product. In one preferred embodiment of the invention the adhesive comprises non-combustible polyurethane foam which is created between the layers, this foam bonding the layers to each other and to the reinforcing stratum of fibers. This foam is preferably of low density, on the order of 3 pounds per cubic foot or less, and is quite thin, on the order of ⅛" or so. With such a composite product, there is provided excellent resistance to the transfer of radiant heat due to the two highly-reflectant (low emissivity) metallic layers on the inner surfaces of the plastic film. The product also has good resistance to the transfer of conductive heat due to the low K factor of the polyurethane foam. Accordingly, the product of the present invention has an apparent K as low as 0.07 B.t.u./ft.² inch ° F. in preferred embodiments thereof.

For a specific preferred embodiment of the invention reference should be had to the following non-limiting examples:

EXAMPLE 1

Two layers of 1 mil polyethylene each having a highly-reflective vacuum-deposited aluminum film were utilized as the outer layers 10 and 12 (see FIG. 1). The aluminum layers 16 and 18 are preferably substantially opaque to visible light having a resistance of about 1 ohm per square. A layer of glass fibers 20 each 2.5 mils in diameter, of nonwoven scrim arrangement (approximate rectangular pattern) was placed adjacent to metal coating layer 18. Thereafter, a suitable polyurethane prepolymer was spread between the layers 16 and 18 and foamed in place (as indicated at 22) in a manner described in U.S. Pat. 3,172,-072. In a preferred embodiment, the polyurethane foam has a density of about 3 pounds per cubic foot and the polyurethane layer 20 is approximately ⅛″ thick. This product had an emissivity of less than .2 from either face and had an apparent K of .07 B.t.u. per ft.$^2$ inch ° F. when measured in accordance with the "Standard Calorimeter Test" described hereinafter.

EXAMPLE 2

Figure 2:
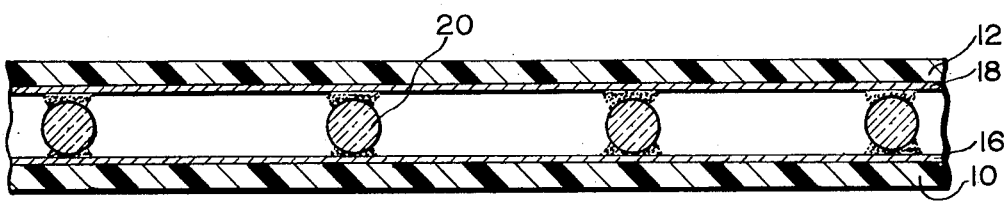

This product was similar to Example 1 except that the polyurethane foam was eliminated and the glass fiber scrim was adhesively united to the two metallized layers by means of a thin layer of adhesive applied to the scrim prior to the formation of the sandwich. This embodiment is shown in FIG. 2, the outer layers 10 and 12 of the sandwich being adhesively united only to the scrim 20 and not to each other. Accordingly, the scrim provided air pockets between the faces of the metallic coatings 16 and 18. This product had an apparent K of .05 B.t.u./ft.$^2$ inch ° F.

In the above example, the glass fiber scrim preferably had about 6 threads per inch, the fiber threads diameter being about 1.5 mil. Generally, the space between the films is essentially a single fiber diameter or less except at points of two or three fibers crossing in the scrim where the spacing between films is essentially two or three fiber diameters respectively. This product could be readily stitched into garments and had extreme tear resistance.

The product of this example is preferably dimpled or otherwise indented during the step of laminating the metallized layers to the scrim layer. This improves the "hand" of the resulting composite fabric without decreasing from the excellent heat barrier or strength characteristics of the material. With or without the dimpling the metallized surfaces of the two films are likely to touch to a great extent in the areas between fibers. This is a non-bonding contact which the product readily tolerates, the product maintains good insulation despite this contact.

EXAMPLE 3

The product of this example was similar to that of Example 2 except that the plastic was ¼ mil polyethylene terephthalate. In this case, the polyethylene terephthalate was not as transparent to infrared radiation as was the polyethylene. However, the metallic surface of the film had essentially the same emissivity as did the metallic surface of the film deposited on the polyethylene of Example 2. This Example 3 product had an apparent K of .12 B.t.u./ft.$^2$ inch ° F.

The "Standard Calorimeter Test" used in the preceding examples is a rather simple calorimeter designed to simulate a portion of the human body (such as a hand) and the effectiveness of the heat loss prevention from the device of a cold ambient atmosphere is directly measured for a number of insulating materials. An aluminum block 6″ x 3½″ x ¾″ is used as the heat reservoir. An internal electrical heater is mounted in this block and the outer surface is covered with black felt to simulate the human body which has an emissivity of about .95. Surface temperature of the felt is read with a thermocouple. The material to be tested is made into a glove which fits over the block. The aluminum block with its glove cover is mounted inside of a refrigerator by hanging from thin glass thread to prevent thermal conduction to the walls of the chambers. The refrigerator is maintained at a constant known temperature.

For the test, the temperature of the air within the refrigerator and the temperature of the surface of the heat source are read. The heat source is maintained at 98° F. to approximate human body temperature. A record is made of the power required to maintain the heat reservoir at this temperature. With these measurements the thermal gradient between the aluminum block and the atmosphere are known, the surface area of the aluminum is known and the power required to maintain the temperature of the block is measured. Therefore, it is possible to determine the apparent K value for the insulating material as well as to compare various materials in identical installations. K value is a function of the thickness of the material of which the glove is fabricated and is expressed in B.t.u.'s per square foot, hour, degree Fahrenheit, per inch of thickness.

While preferred embodiments of the invention have been described in Examples 1 and 2, the invention is subject to considerable modification without departing from the spirit thereof. Polypropylene can be substituted for polyethylene in each of Examples 1 and 2. A wide variety of adhesives, foamed or unfoamed, can be used for securing the reinforcement to the films, including polyurethane, epoxy, tacky resins, polyethylene coating on the fibers, low molecular weight styrenes, low molecular weight polyisobutylene. It is also possible to use heat sealing techniques particularly in connection with embodiments described below. Additionally, both surfaces of each of the outer plastic films or either of them can be metallized, although very little improvement in performance is gained by doing so.

Figure 3:
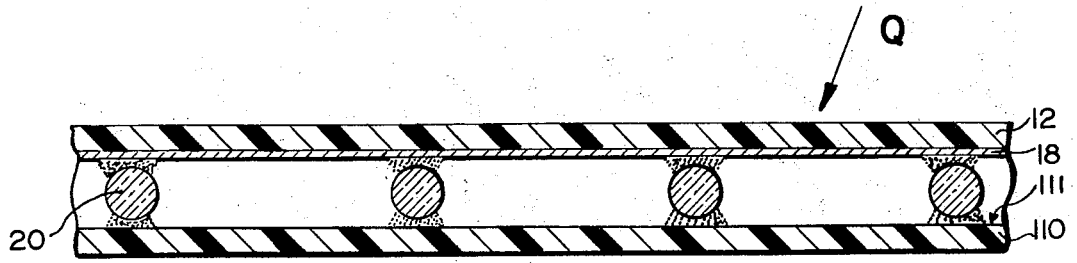

A variation of the Example 2 embodiment is shown in FIG. 3. In FIG. 3 there is an outer plastic film (polyethylene or other plastic having a radiation transmission of at least 80% in the 80,000–90,000 angstrom range) 12 with a vacuum metallized layer 18 of aluminum bonded to a fiber scrim layer 20 which is also bonded to the inner surface of the other plastic film 110, all as in Example 2. However, in this case the other layer of plastic film 110 is unmetallized—a clear layer of polyethylene of the same thickness as layer 12 (typically .00125 inch). Since the thickness of the metallized layer is negligible, this product has essentially the same thickness as the Example 2 product.

The FIG. 3 product has printed matter on the inner surface 111 thereof which is protected from abrasion by its interior location. The product is generally arranged to face a heat source coming from the side indicated by the arrow Q with a viewer seeing the printed matter from the side indicated by the arrow A. For instance, the product could be a stadium blanket or sweat suit wrapped around a person with the film 12 next to the person and coloring or printed matter on the film 110 displayed by the product on the opposite side.

However, it is a specific advantage of this product, that its heat reflecting properties are not entirely unidirectional. Even if the wearer turns the printed side of the product inward (i.e. wearer at A), the product will exhibit insulation ability almost as good as when it is used in the correct manner. This ability to reflect heat, when used in the reverse mode is due to (a) the open mesh of the reinforcing scrim layer 20 (spacing between fibers several times fiber diameter) and lack of adhesive between fibers which makes the fiber layer essentially transparent to infra-red radiation, and (b) the fact that the colored or printed polyethylene film 110, while absorbing more radiation than clear film in the visible spectrum is still more than 80% transmissive in the 80,000–90,000 angstrom portion of the infra-red range which is far more significant for heat insulating and personal comfort.

A variant of the embodiment of the FIG. 1/Example 1 would be a foam laminate as shown in FIG. 1 with only one of the outer plastic films being metallized. Such a product would be essentially uni-directional in its insulating characteristics, but would have the same thinness, strength, low cost, "hand" and light weight of the FIG. 1 product.

Figure 4:
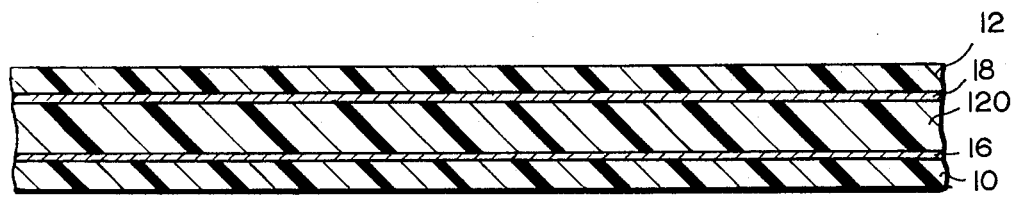
Figure 5:
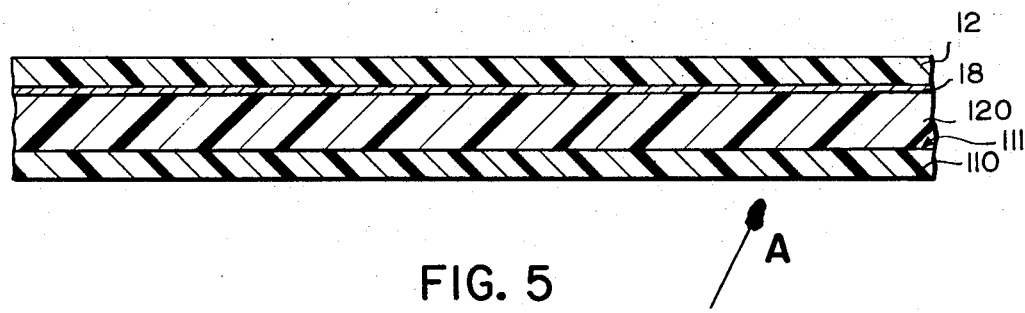

A further distinct embodiment of the invention is shown in FIGS. 4 and 5 in two variations. In FIG. 4 the product comprises two outer polyethylene films, 10 and 12; 110 and 12 in FIG. 5 sandwiched about a reinforcing polyethylene film 120. In FIG. 4, the inner surfaces of both outer plastic films are vacuum metallized (16, 18). In FIG. 5, only film 12 is metallized. Film 110 is unmetallized and may have printing on film 110. Reinforcing film 120 is secured to the inner surfaces of the outer plastic films by adhesives as described above or by heat sealing. Any adhesives used should be extremely thin and transparent in the case of the FIG. 5 product to allow bi-directional insulating use. Normally the printed matter on surface 111 would be displayed to a viewer looking from A. But if the source of heat to be reflected were from this direction, the high transmission through films 110 and 120 would allow the product to work with a high percentage of the insulating value normally enjoyed when film 12 is on the side of the product facing the heat source. The film 120 should be thicker than the outer films (typically 2 mils compared to 1 mil for each of the outer films).

The product of either FIG. 4 or FIG. 5 lacks the air pockets provided by the FIG. 1 and FIG. 2–3 embodiments but has the advantage of being even thinner and even more economical to manufacture. A typical thickness for the product of FIGS. 4–5 is 4 mils (2 mils reinforcement film thickness and 1 mil for each of the outer films) in contrast to a maximum thickness of the FIG. 2–3 product of about 5–7 mils (thickness of two outer films plus 2 or 3 fibers at cross-over points). This lesser maximum thickness of the FIG. 4–5 embodiment allows tighter folding and smaller storage area. In connection with economy of manufacture, the thin outer films 10 and 12 are optimum for economical vacuum metallizer usage while the thicker film 120 is optimum for reinforcement and the printed film 110 can be as thin as the other outer film (12) because reinforcement film 120 is relied on for product strength. Another economy afforded by the FIG. 5 arrangement is that films 110 and 120 can have complementary patterns, prints and/or colors to avoid the need for complex two-color printing, or the like, on surface 111 of film 110. Despite such two film coloring, the combined thickness of films 110 and 120 will provide adequate transmission of infra-red radiation if they are disposed between a source of heat to be reflected and the interior metal film 18.

In addition to or as an alternate to coloring or printing the unmetallized layer of the products of FIG. 3 or FIG. 5, the metallized layers thereof can be printed. Also either or both metallized layers of the FIG. 1, FIG. 2, FIG. 4 products can be colored and/or printed.

The coloring dyes selected in any of the above instances should be selected from maximum transmission of radiation in the infra-red range, particularly as noted above, to provide that the colored plastic shall have more than 80% transmission in the 80,000–90,000 angstrom wavelength range. Printing inks will generally have a lower transmission; if so, they should therefore be applied in the most open pattern possible—with at least a majority of the plastic surface area unprinted—to substantially utilize the principles of the present invention in the unprinted areas of the product.

The plastic film reinforcement 120 of the FIG. 4 or FIG. 5 embodiments can be excised mechanically or thermally (e.g. by fusing in a regular hole pattern) to include 25–75% of open area in its surface to improve the insulating value of the product by forming air pockets (as in FIGS. 2–3) without impairing the strength of the product. Like the FIG. 2–3 embodiments the reinforcement as a whole is flat and the spacing between films is no greater than the inherent flat thickness of the reinforcement.

As a further variation of the invention the plastic film layer 120 of FIGS. 4–5 could be replaced by a layer of foam which would lack the strength and foldability of the FIG. 4 and FIG. 5 embodiments but would have better insulating properties. The foamed product would be similar to the FIG. 1 embodiment in thickness. Also, the foam could be excised as shown in Pat. 3,130,112 to Anderson.

Figure 6:
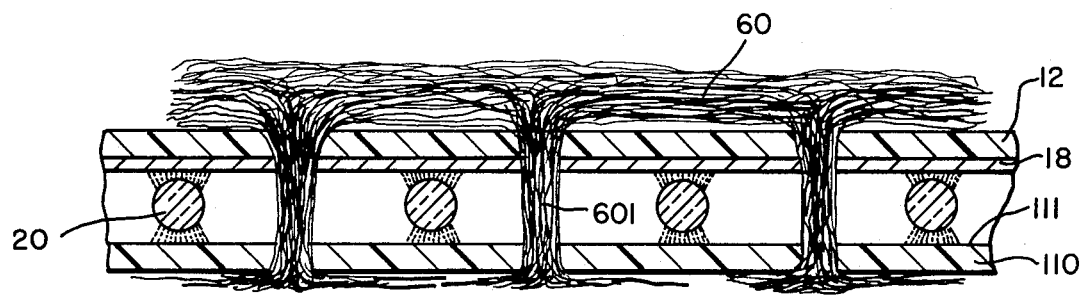

FIG. 6 shows a variation of the product of FIG. 3 (which is similarly applicable to the products of FIGS. 1 and 2) in which a fibrous layer is laminated to a plastic surface of the laminate to provide reinforced holes in the laminate to make it breathable. The base laminate includes the items 12, 18, 20, 110 described above in connection with FIG. 3 (and, if desired, with printed matter at the surface 111 of plastic layer 110), and additionally comprises a layer 60 of non-woven fibrous sheet material. The non-woven material may be of various common forms—felted, air laid, bonded, etc. It is mechanically adhered to the base laminate by needle punching through the laminate, as indicated at 601. The density of needle punching is on the order of one hundred punch-throughs per square inch of base laminate surface area. Practical limits of such density are at least 50 and no more than 300 to provide adequate adhesion between the layer 60 and the base laminate and moisture vapor transmission ("breathability") and to retain sufficient metallized coating area (layer 18) to provide significant reflectance.

Figure 7:
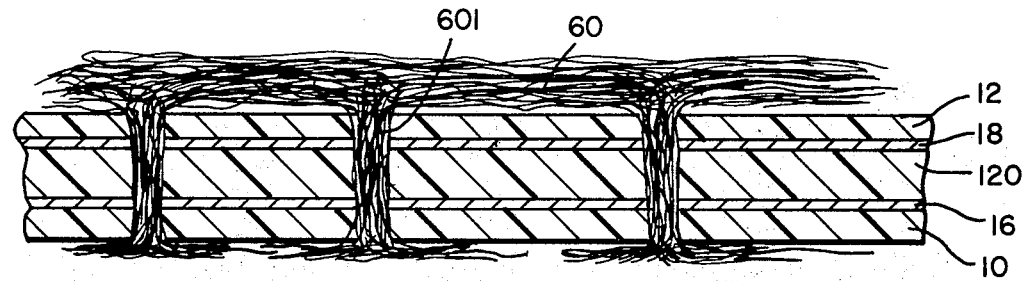

FIG. 7 shows an analogous variation of the FIG. 4 product (also applicable to FIG. 5) in which the non-woven fibrous layer is needle punched to the base laminate.

The process of laminating a non-woven layer to a plastic film or to a film/fabric base laminate is an old one; see e.g. U.S. Pat. 3,366,529 of Olson and references cited therein. However in the present case the second step of heat retraction, applied in Olson, may be omitted and preferably is omitted to preserve a large metal coated closed area.

The resultant product of either of the FIG. 6 or FIG. 7 species has a high moisture vapor transmission which enhances its utility in clothing, clothing linings, bed blankets and the like. The soft layer 60 gives the laminate an improved hand and has a comfortable feel when disposed towards the wearer. The human body radiant heat (wavelength of 8–9 microns) reflecting properties of the laminate are only reduced to the extent of the area punched through at 601 and are not reduced by the presence of layer 60 on one side or by the loosely dispersed punched through fibers on the back side. Coloring or printed matter can be viewed from the back side of the laminate, but is substantially obscured on the front side of the laminate by layer 60.

It is desirable to pass the laminate/non-woven combination through rollers after needle punch bonding to settle down the fibers on the back side of the laminate for improved appearance.

The fibers are preferably selected from synthetics—polyethylene, polyesters, nylon, etc.; but natural fibers—cotton, etc.—may be used. It is desirable to coat the fibers with a topcoat water repellent resin to make it machine washable (AATCC class I test with machine washing at 105° F. three times). Several commercial products are available for this purpose, including water base silicone coatings. Such treatment makes the product more resistant to the pilling tendency which the fibrous layer would otherwise ordinarily display as a result of machine washing. Such treatment also makes the product reasonably water resistant for purposes of outdoor wearing.

EXAMPLE 4

Layers of polyester fiber non-woven fabric were needle punched through laminates of the type shown in FIG. 2. Some of the non-woven fabric was soaked in a silicone water emulsion before punching and some was not. In all cases the punched through laminate was rendered highly permeable to moisture vapor transmission (and light) as a result of the punching through. Water was dripped onto specimen samples of the material resting on filter paper to show (through wetting and discoloration of the paper when the water dripped through). Water dripping on the fabric side of a product without silicone penetrated in one minute. But water dripping on the plastic back side (ignoring the light density of punched through fibers) took ten minutes to penetrate. Product containing silicone coated fibers resists water penetration for hours when tested with water dripping from either side.

The Standard Calorimeter Test described above was applied to several of the needle punched samples and controls. For comparison purposes, only watts/hour was recorded. The results were:

Sample: Average power drawn, watts/hr.
(1) "Bare Hand" (no cover on heat source) --- 24
(2) Hand cover made of laminate with fabric towards heat source -------------------- 10
(3) Hand cover made of laminate with fabric on outside ---------------------------- 10
(4) Same as (2) with water repellent coating on fibers ------------------------------- 10
(5) Same as (3) with water repellent coating on fibers ------------------------------- 10
(6) FIG. 2 laminate with no fabric layer ---- 12

Thus the fabric reduced heat loss by ½.

It is also apparent that the fabric can be secured on both sides of the plastic laminate.

The fabric side can be silk screened after attachment through needle punching for printing designs or lettering thereon.

What is claimed is:

1. An insulating material comprising two outer layers of organic plastic film, a thin vacuum-deposited layer of metal on each film, a layer of reinforcing fibers sandwiched between said layers of plastic film, the metal-coated surfaces of the plastic film facing inwardly and being adhesively united to the fibers, at least one of the plastic films having a transmission in excess of 80% for IR radiation in the range of 80,000 to 90,000 angstroms wavelength.

2. An insulating material comprising two outer layers of organic plastic film, at least one thin vacuum-deposited layer of metal on each film, a layer of reinforcing fibers sandwiched between said layers of plastic film, metal-coated surfaces of the plastic film facing inwardly and being adhesively united to the fibers by a polyurethane foam formed in situ between the layers of film, at least one of the plastic films having a transmission in excess of 80% for IR radiation in the range of 80,000 to 90,000 angstroms wavelength.

3. An insulating material comprising two outer layers of organic plastic film, at least one thin vacuum-deposited layer of metal on each film, a layer of reinforcing fibers sandwiched between said layers of plastic film, metal-coated surfaces of the plastic film facing inwardly and being adhesively united to the fibers, at least one of the plastic films having a transmission in excess of 80% for IR radiation in the range of 80,000 to 90,000 angstroms wavelength, the outer surface of said plastic film having an emissivity of less than .2 at a wavelength of 80,000.

4. An insulating material comprising two outer layers of organic plastic film, a thin vacuum-deposited layer of metal on at least one surface of each film, a layer of reinforcing fiber sandwiched between said layers of plastic film, metal-coated surfaces of the plastic film facing inwardly and being adhesively united to the fiber, the plastic film being polyethylene, the material having an apparent K of less than .10 b.t.u./ft.$^2$ inch ° F. when measured in accordance with the "Standard Calorimeter Test."

5. An insulating material comprising two outer layers of organic plastic film, a thin vacuum-deposited layer of metal on at least one surface of each film, a layer of reinforcing fiber sandwiched between said layers of plastic film, metal-coated surfaces of the plastic film facing inwardly and being adhesively united to the fiber, the plastic film being polypropylene, the material having an apparent K of less than .10 b.t.u./ft.$^2$ inch. ° F. when measured in accordance with the "Standard Calorimeter Test."

6. An insulating material comprising two outer layers of organic plastic film, a thin vacuum-deposited layer of metal on at least one of said films, a layer of reinforcing fibers sandwiched between said layers of plastic film, the metal-coated surfaces of the plastic film, facing inwardly and being adhesively united to the fibers, at least one of the plastic films having a transmission in excess of 80% for IR radiation in the range of 80,000 to 90,000 angstroms wavelength.

7. An insulating material comprising two outer layers of organic plastic film, at least one thin vacuum-deposited layer of metal on at least one of said films, a layer of reinforcing fibers sandwiched between said layers of plastic film, metal-coated surfaces of the plastic film facing inwardly and being adhesively united to the fibers by a polyurethane foam formed in situ between the layers of film, at least one of the plastic films having a transmission in excess of 80% for IR radiation in the range of 80,000 to 90,000 angstroms wavelength.

8. An insulating material comprising two outer layers of organic plastic film, at least one thin vacuum-deposited layer of metal on at least one of said films, a layer of reinforcing fibers sandwiched between said layers of plastic film, metal-coated surface of the plastic film facing inwardly and being adhesively united to the fibers, at least one of the plastic films having a transmission in excess of 80% for IR radiation in the range of 80,000 to 90,000 angstroms wavelength, the outer surface of said plastic film having an emissivity of less than .2 at a wavelength of 80,000.

9. An insulating material comprising two outer layers of organic plastic film, a thin vacuum-deposited layer of metal on at least one surface of at least one of said films, a layer of reinforcing fiber sandwiched between said layers of plastic film, metal-coated surfaces of the plastic film facing inwardly and being adhesively united to the fiber, the plastic film being polyethylene, the material having an apparent K of less than .10 B.t.u./ft.$^2$ inch ° F. when measured in accordance with the "Standard Calorimeter Test."

10. An insulating material comprising two outer layers of organic plastic film, a thin vacuum-deposited layer of metal on at least one surface of at least one of said films, a layer of reinforcing fiber sandwiched between said layers of plastic film, metal-coated surfaces of the plastic film facing inwardly and being adhesively united to the fiber, the plastic film being polypropylene, the material having an apparent K of less than .10 B.t.u./ft.$^2$ inch ° F. when measured in accordance with the "Standard Calorimeter Test."

11. A laminated insulating material comprising two outer layers of organic plastic film with opposed inner surfaces, a thin vacuum-deposited coating of metal on at least one of said films on the inner surface thereof facing inwardly towards the inner surface of the other film, a layer of reinforcement sandwiched between the said layers of plastic film, the inner surfaces of said films being adhered to said reinforcement, at least one of said films having a radiation transmission in excess of 80% for infrared radiation in the wavelength range of 80,000–90,000 angstroms.

12. The product of claim 11 with said reinforcement being in the form of a layer of reinforcing fibers.

13. The product of claim 12 with said layer of reinforcing fibers being in the form of an open mesh fabric to provide open space in the reinforcement, the laminate being substantially free of plastic film to plastic film bonding across said spaces and the laminate being constructed and arranged to provide a spacing between said plastic films essentially no greater than the thickness of the fabric.

14. The product of claim 12 with the adhesive being a low density polyurethane foam formed in situ between the layers of film and incorporating the said fibers therein, the foam essentially filling the space between films.

15. The product of claim 14 with the laminate being constructed and arranged so that the foam is about ⅛ inch thick.

16. The product of claim 11 with the laminate having an indented texture to simulate a cloth.

17. The product of claim 11 with said reinforcement being a continuous sheet material.

18. The product of claim 17 with the reinforcing sheet being an organic plastic film having a thickness in excess of the thickness of any metallized outer film.

19. The product of claim 17 with the said reinforcing sheet being an organic plastic film having a transmission in excess of 80% for infra-red radiation in the wavelength range of 80,000–90,000 angstroms and wherein only one of said outer film layers is metallized.

20. The product of claim 11 with only one of said outer plastic films being metallized on their inner surfaces.

21. The product of claim 11 with both of said plastic films being metallized on their inner surfaces.

22. The product of claim 11 wherein the film having transmission in excess of 80% as aforesaid is polyethylene.

23. The product of claim 11 wherein the film having the transmission as aforesaid is polypropylene.

24. The product of claim 11 wherein the film having the transmission as aforesaid is at least partially opaque in the visible wavelength spectrum.

25. The product of claim 11 wherein the laminate comprises an additional outer layer of non-woven fabric with fiber bundles extending from said outer layer through holes in the laminate to render said laminate breathable.

26. The product of claim 25 wherein the fibers of said additional layer are provided with a water repellent top coat.

References Cited

UNITED STATES PATENTS

| | | | |
|---|---|---|---|
| 2,961,465 | 11/1960 | Sroog | 161—214 |
| 3,118,781 | 1/1964 | Downing | 161—408 |
| 3,308,004 | 3/1967 | Rouault | 161—408 |
| 3,310,453 | 3/1967 | Lappala et al. | 161—49 |

WILLIAM J. VAN BALEN, Primary Examiner

U.S. Cl. X.R.

161—154, 159, 161, 165, 190, 214, 216, 413